United States Patent [19]

Brotz

[11] Patent Number: 5,607,223
[45] Date of Patent: Mar. 4, 1997

[54] ILLUMINATED CLIPBOARD WITH MOVABLE WRITING SURFACE

[76] Inventor: Gregory R. Brotz, P.O. Box 1322, Sheboygan, Wis. 53081

[21] Appl. No.: 602,292

[22] Filed: Feb. 16, 1996

Related U.S. Application Data

[63] Continuation-in-part of Ser. No. 463,764, Jun. 5, 1995, Pat. No. 5,502,623.
[51] Int. Cl.⁶ ........................................ F21V 33/00
[52] U.S. Cl. .................... 362/99; 362/32; 362/98
[58] Field of Search ........................... 362/26, 32, 97, 362/98, 99, 253

[56] References Cited

U.S. PATENT DOCUMENTS

| | | | |
|---|---|---|---|
| 1,279,820 | 9/1918 | Brassard | 362/99 |
| 2,140,090 | 12/1938 | Oppenheimer | 362/98 |
| 2,629,043 | 2/1953 | Holtje | 362/99 |
| 3,215,453 | 11/1965 | Malcolm, Jr. | 362/99 |

*Primary Examiner*—Stephen F. Husar
*Attorney, Agent, or Firm*—William Nitkin

[57] ABSTRACT

An illuminated clipboard for use by a seated individual in dark surroundings with structure to attach the clipboard to a leg of the user, such clipboard having a light-emitting body in one embodiment with means to illuminate therethrough utilizing a sheet of illuminated material disposed thereunder and a translucent roll of film or paper on a spool which is passed from a storage roller to a take-up roller over the active writing surface of the light-emitting planar surface in immediate contact therewith such that indicia or writing thereon is visible to the user by backlighting from the underlying illuminated planar body.

1 Claim, 2 Drawing Sheets

ILLUMINATED CLIPBOARD WITH MOVABLE WRITING SURFACE

This application is a continuation-in-part of my previous application entitled Illuminated Clipboard, Ser. No. 08/463,764 filed Jun. 5, 1995, now U.S. Pat. No. 5,502,623.

BACKGROUND OF THE INVENTION

1. Field of the Invention

The structure of this invention resides in the area of clipboards and more particularly relates to an illuminated clipboard of the type having a source of light under its top writing surface to shine through writing material thereon with such writing material being a movable strip of translucent film or paper material disposed on a supply spool to be wound on a take-up roller during use of the device.

2. Description of the Prior Art

The concept of illuminating clipboards is known in the prior art. Applicant's prior invention in the field, U.S. Pat. No. 5,381,310 discloses a clipboard with a luminescent sheet disposed under the usable writing area of the clipboard. Other patents in the field also disclose writing surfaces with illumination means.

SUMMARY OF THE INVENTION

It is an object of this invention to provide a new and improved illuminated clipboard with a unique structure that is especially useful for pilots of airplanes or others who are sitting and need to write in darkness or surroundings of low illumination.

The clipboard of this invention is disposed on a leg-engaging portion which is shaped to fit over the thigh of the user and held thereto by a strap or other equivalent means. The clipboard is positioned on the user such that the user's hand will come to rest near the writing surface of the illuminated clipboard. The clipboard has an illumination means disposed under its writing surface which can be an electroluminescent sheet, an illuminated woven fiber optic cloth disposed under a planar sheet of stiff transparent material such as plastic forming such writing surface, or a hard illuminated surface produced by a solid member having a planar upper surface that is light-transmitting and a curved lower reflective surface having an internal light source, such as described below and in my copending patent application. On the illuminated surface is disposed a film or paper, also of transparent or translucent material such as a plastic film that can be rolled from a supply spool to a take-up roller. Such film or paper can have a surface suitable for writing on. The take-up roller can be manually or electrically powered, if desired.

DESCRIPTION OF THE PREFERRED EMBODIMENT(S)

Figure 1:
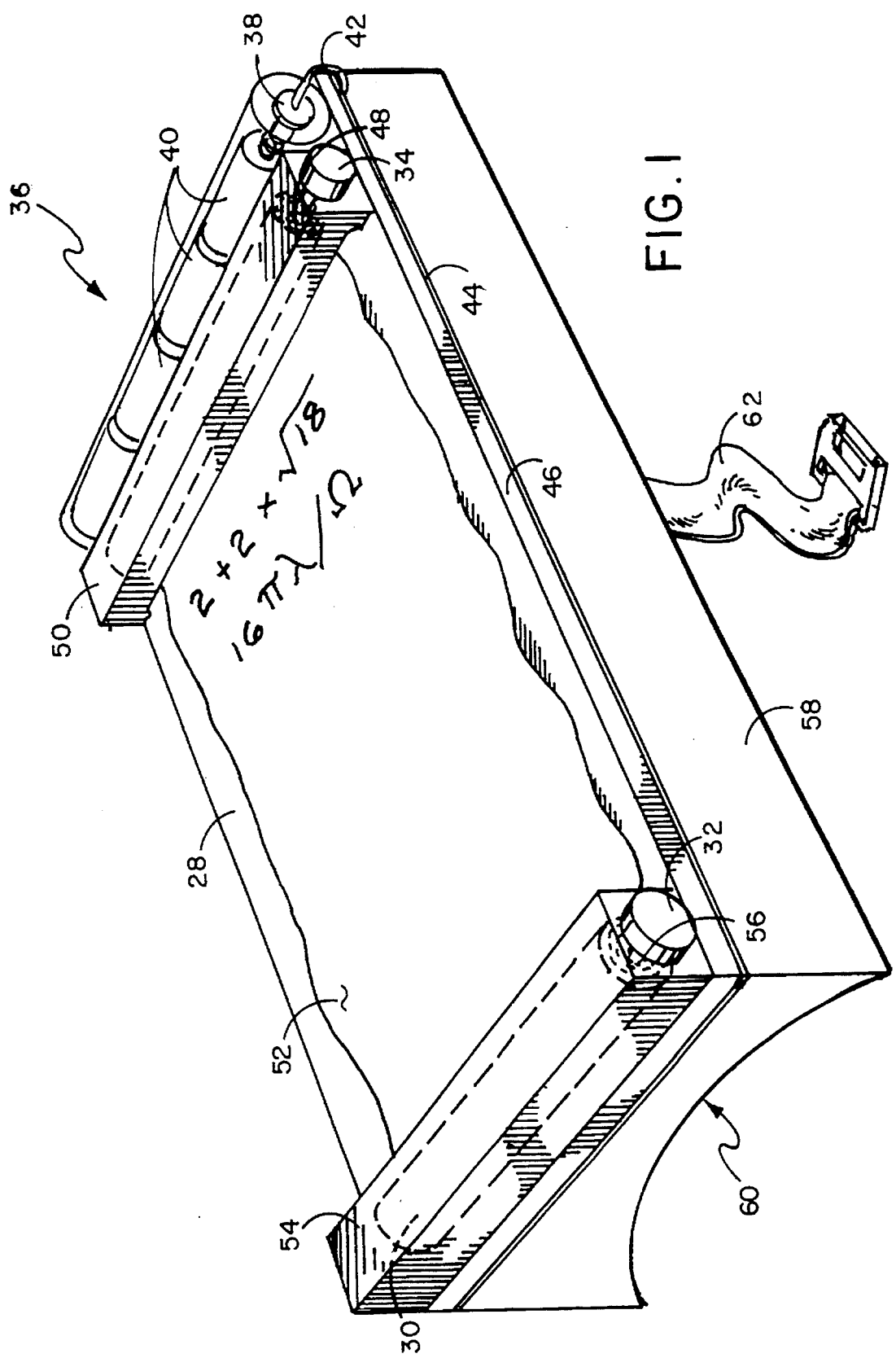
FIG. 1 illustrates a perspective view of the illuminated clipboard of this invention showing its various features.
Figure 3:
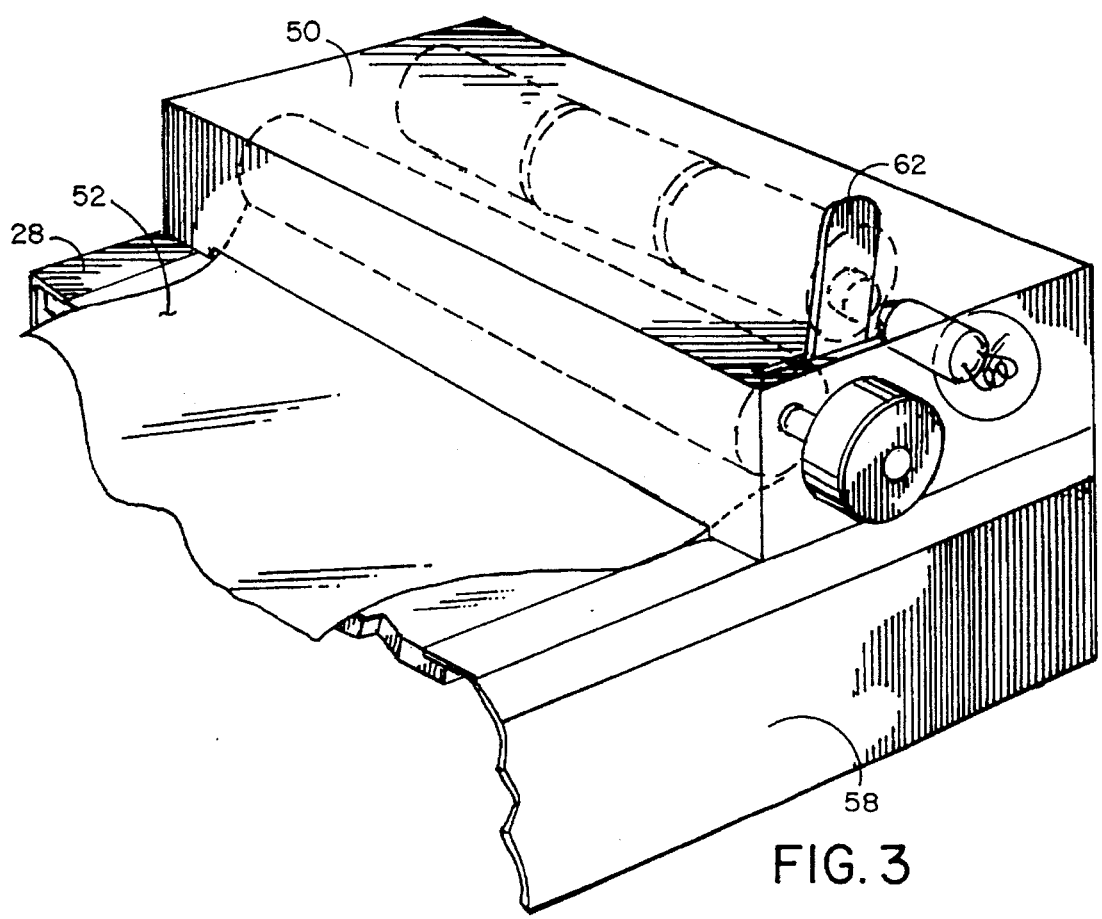
FIG. 3 illustrates a perspective view of a section of the device showing a manually operated ratchet mechanism to operate the take-up roll.

FIG. 1 illustrates a perspective view of the illuminated clipboard 36 of this invention having a leg-engaging portion 58 disposed thereunder having a leg receipt area 60 defined therein which is curved to fit over the user's thigh when the user is in a generally seated position. A strap 62 can pass around the user's leg to attach to the other side of the clipboard structure so as to securely hold the clipboard in position on the user's leg so that the pilot can easily write on the clipboard. The clipboard can utilize one of several different types of illumination under its transparent planar body 46. In this embodiment a woven fiber optic sheet 44 extends under the entire area of transparent planar body 46 which sheet is illuminated through fiber optic cable 42 receiving light from light bulb 38 powered by batteries 40 within a battery enclosure. Clipboard 36 has on its upper planar surface 28 of transparent planar body 46 a generally translucent film 52 or translucent paper which is provided in a spool 30 and can be wound manually or by electric means to move onto take-up roller 48 held within a take-up roller housing 50 such that the film will move from spool 30 held within spool housing 54 over to take-up roller 48 while making contact with upper planar surface 28. By rotating take-up roller 48 manually, translucent film 52 will pass over upper planar surface 28 of transparent planar body 46 in immediate contact therewith. Notes can be made on the translucent film in the area above upper planar surface 28 such as the writing seen in FIG. 1 which is visible thereon by backlighting. When these notes, computations, etc. are placed on film 52, any unused portion of translucent film 52 can be brought onto the upper planar surface 28 of transparent body 46 by rolling the used portion onto take-up roller 48. The process continues until the entire spool of translucent film has been utilized which spool can then be replaced with a new unused spool of translucent film or paper. Should the user wish to review or refer to a prior note or computation, the user can easily back up spool 30 by reversing the take-up process. The film or paper can be moved back and forth by rotating knobs 32 and 33 positioned at the end of each roller. The rollers can also be electrically operated by putting a small electric motor within one or both of the housings 50 and 54 to rotate the spools of film or paper in the selected direction. In a further alternate embodiment, as seen in FIG. 3, take-up roller 48 can be rotated by a geared ratchet mechanism 62 which can be moved by hand to quickly wind up the film or paper being written on. By utilizing the device of this invention, the user does not have to place individual sheets of film or paper on the upper planar surface in darkness and keep track of them after they have been removed.

Figure 2:
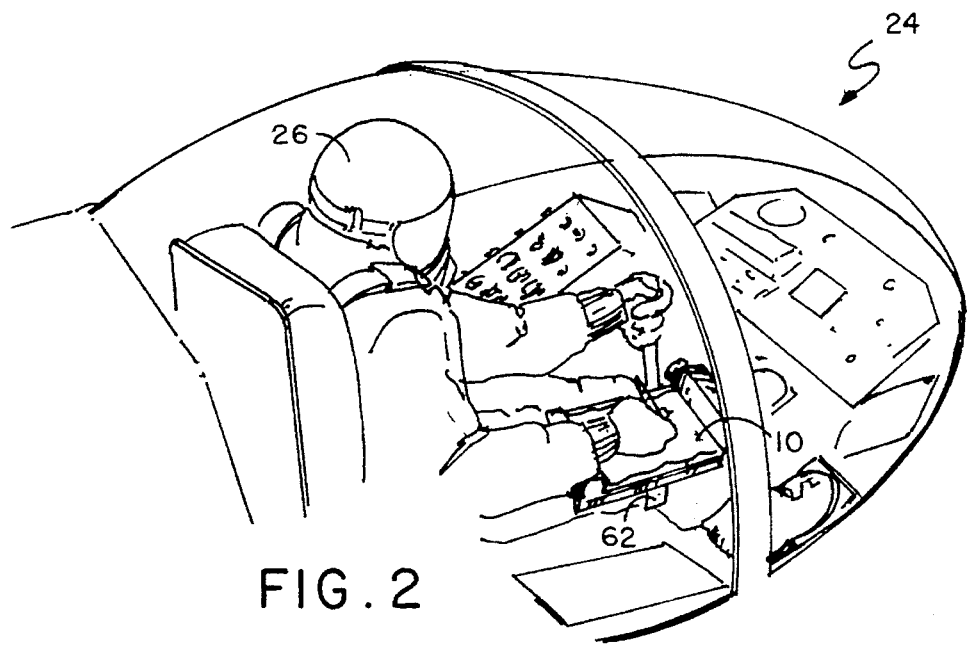
FIG. 2 illustrates a perspective view of the cockpit of an airplane showing a pilot utilizing the clipboard of this invention.

FIG. 2 shows the illuminated clipboard of this invention utilized by a pilot 26 within an airplane 24 with such clipboard strapped onto the pilot's leg. The clipboard utilizes a stiff plastic planar transparent body under which is disposed an illumination sheet which can be illuminated by a variety of luminescent sheets placed thereunder. In one embodiment electricity from a battery pack can be directed through electrical lines to such illumination sheet which also can be of the electroluminescent type such that the electric current, when turned on from the battery pack, causes the electroluminescent material of the illumination sheet to glow, thereby providing light through the planar transparent body of the illuminated clipboard. In another embodiment the battery power can be directed to a light embedded within a solid, curved-bottomed, flat-topped, transparent body which structure causes such light to reflect off the interior of its bottom and out its upper planar surface, as described in my co-pending patent application, Ser. No. 08/463,764 filed Jun. 5, 1995 entitled Illuminated Clipboard now U.S. Pat. No. 5,502,623. A clip can be used to hold papers onto the clipboard. The light from below the paper from the illumination sheet shines through the transparent body and the film or paper to make visible to the user of the device any indicia thereon.

Although the present invention has been described with reference to particular embodiments, it will be apparent to those skilled in the art that variations and modifications can be substituted therefor without departing from the principles and spirit of the invention.

I claim:

1. An improved illuminated clipboard for use on a leg of the user, comprising:

a leg-engaging portion disposed beneath said clipboard;

a transparent planar body positioned above said leg-engaging portion, said transparent planar body having an upper planar surface forming an active writing surface;

illumination means disposed under said active writing surface of said transparent planar body, said illumination means comprising an illuminated sheet of material;

a spool of translucent material;

a first roller and a second roller, each disposed above said transparent planar body, said first roller adapted to receive said spool of translucent material, said second roller adapted to receive said translucent material as said translucent material passes from said first roller over said upper planar surface of said transparent planar body to said second roller for take-up thereon;

means to roll said translucent material from said first roller to its storage position on said second roller;

a first roller housing disposed over said first roller for storage of unused translucent material; and a second roller housing disposed over said second roller for storage of used translucent material.

* * * * *